Sept. 27, 1960  C. R. BILBREY  2,954,186
COORDINATED CONTROL AUTOGYRO

Filed Jan. 14, 1958  2 Sheets-Sheet 1

CHARLES R. BILBREY
INVENTOR.

BY

ATTORNEY.

Sept. 27, 1960     C. R. BILBREY     2,954,186
COORDINATED CONTROL AUTOGYRO
Filed Jan. 14, 1958     2 Sheets-Sheet 2
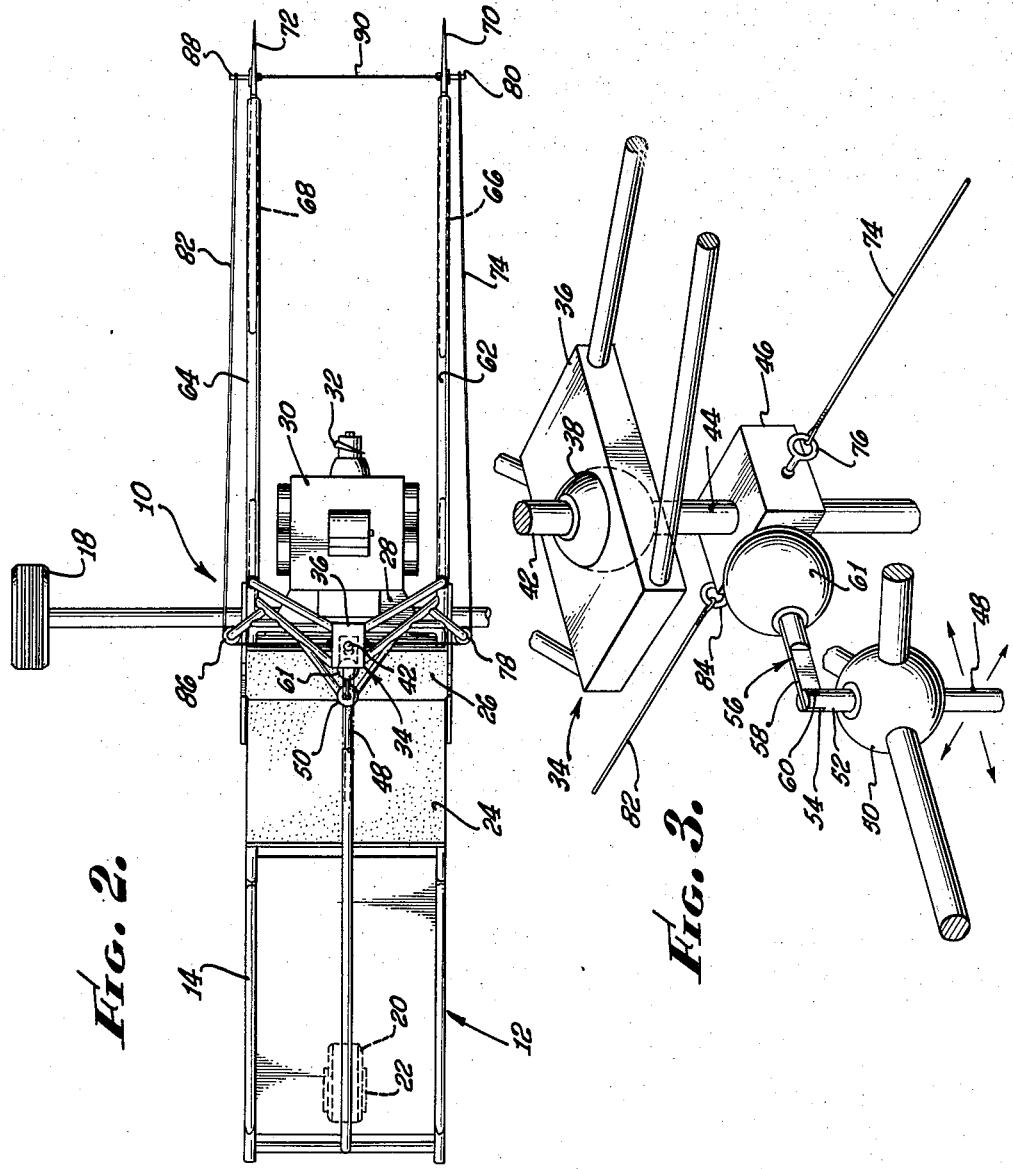
CHARLES R. BILBREY
INVENTOR.
BY
ATTORNEY.

United States Patent Office 2,954,186
Patented Sept. 27, 1960

2,954,186

COORDINATED CONTROL AUTOGYRO

Charles R. Bilbrey, 3311 N. Seventh Ave., Phoenix, Ariz.

Filed Jan. 14, 1958, Ser. No. 708,895

9 Claims. (Cl. 244—17.19)

My present invention relates to rotary wing aircraft, and it relates particularly to a novel rotary wing aircraft of the autogyro type in which a single control member adjustably controls the rotary wing relative to the aircraft frame and simultaneously controls a rudder hingedly mounted on the frame to the rear of the rotary wing in order to provide coordinated, banked turns by manipulation of this single control member.

Heretofore all rotary wing aircraft, including both autogyros and helicopters, have provided separate and independent control mechanisms for controlling the tilt or cyclic pitch of the rotary wing and for controlling the rudder. Thus, in the prior art, the rudder of a rotary wing aircraft was normally controlled through a conventional rudder bar or foot pedals, whereas the tilt or cyclic pitch of the rotary wing was controlled through a control stick. Because of these independently operable control members for controlling the rotary wing and the rudder in prior art rotary wing aircraft, it has heretofore required a great deal of skill for the pilot to fly in a properly coordinated, banked turn.

In view of this and other problems in connection with prior art rotary wing aircraft, it is an object of my present invention to provide an autogyro in which the manipulation of a single control member will simultaneously adjust the tilt or cyclic pitch of the auto-rotating wing and the positioning of the hinged rudder, whereby manipulation of this single control member will induce a properly banked turn of the craft.

Another object of my present invention is to provide a coordinated control autogyro of the character described in which the tilting or cyclic pitch of the auto-rotating wing is directly controlled by a tiltable rotor head member, this tiltable rotor head member being operatively connected to the control member and also to the rudder, whereby manipulation of the control member to adjust the tilt or cyclic pitch of the rotary wing will simultaneously adjust the positioning of the rudder.

Other objects and advantages of my present invention will be apparent from the following description and claims, the novelty of my invention consisting in the features of construction, the combinations of parts, the novel relations of the members and the relative proportioning, disposition and operation thereof, all as is more completely described herein and is more particularly pointed out in the appended claims.

In the accompanying drawings, forming a part of my present specification:

Fig. 2 is a top plan view of my autogyro shown in Fig. 1, along the line 2—2 in Fig. 1.

Fig. 3 is an enlarged fragmentary perspective view particularly illustrating the rotor head construction and the manner in which the control stick and the rudder cables are operatively connected to the rotor head.

Figure 1:
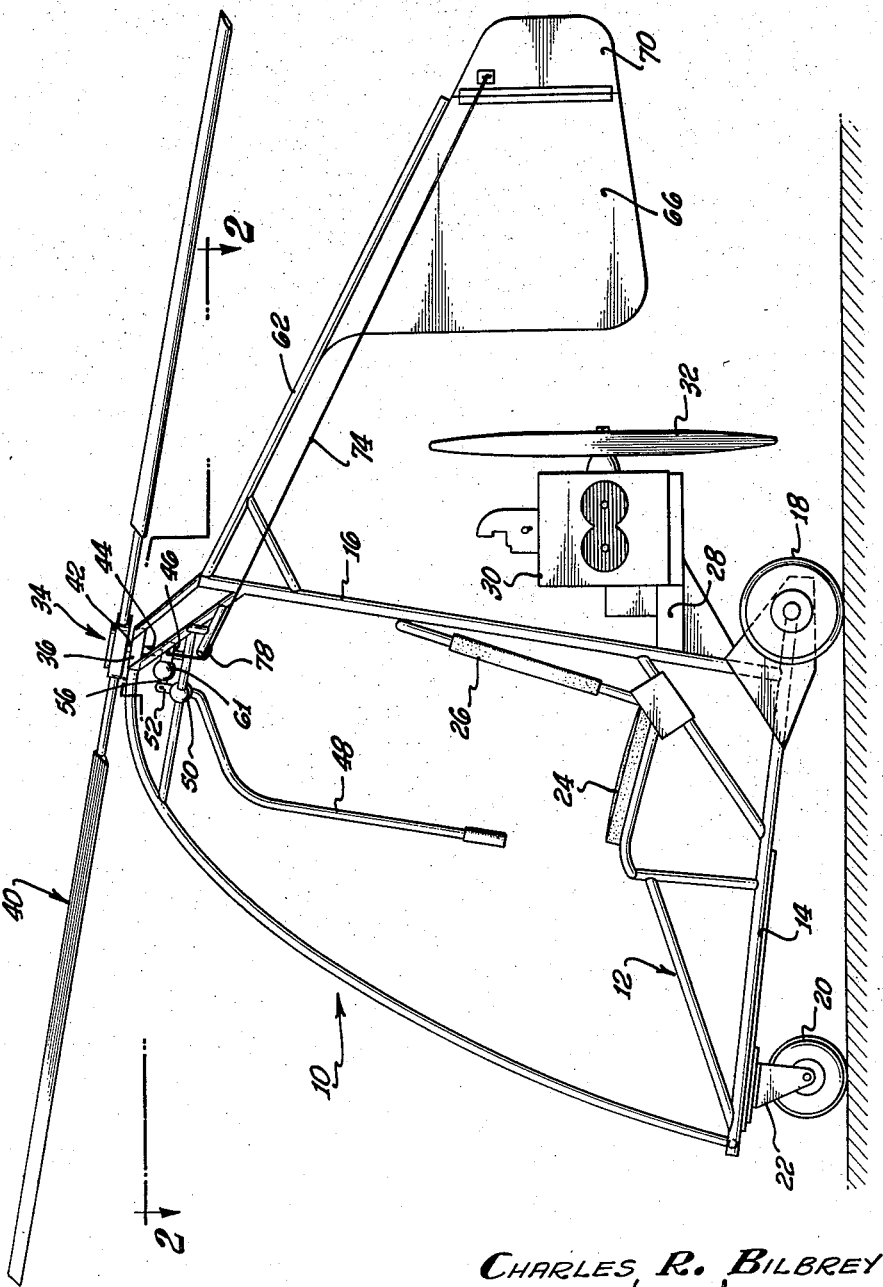
Fig. 1 is a side elevation view of my autogyro, illustrating my presently preferred general layout.

Referring to my drawings, the presently preferred embodiment of my autogyro 10 comprises a one or two man craft which is light in weight, simple in construction and very inexpensive to manufacture.

My autogyro 10 is provided with a tubular frame 12, preferably of aluminum tubing, the frame 12 including a floor portion 14 and an upwardly extending portion 16.

I provide a pair of spaced rear wheels 18 and a single front wheel 20. I have illustrated the front wheel 20 as being mounted on a suitable caster 22, although it is to be understood that front wheel 20 may alternatively be provided with conventional manual steering means, such as foot bar (not shown).

Independently operable brakes (not shown) may be provided on the rear wheels 18 for steering on the ground, if desired.

A seat 24 having a seat back portion 26 is mounted on the tubular frame 12 in the manner best shown in Fig. 1.

I provide an engine mount 28 to the rear of the upwardly extending portion 16 of tubular frame 12 upon which a conventional aircraft engine 30 is mounted. The pusher type propeller 32 is mounted on a substantially horizontal axis to provide forward, generally horizontal propulsion of the autogyro 10.

A rotor head assembly 34 is mounted at the top of upwardly extending portion 16 of tubular frame 12. Included in the rotor head assembly 34 is a bearing member 36 fixedly mounted on the tubular frame 12, the fixed bearing member 36 supporting a swivel ball 38. The auto-rotating wing 40 is integrally attached to the upper end of rotor shaft 42 which passes downwardly through the swivel ball 38 and is rotatably mounted in the ball 38.

During normal, level flight of my autogyro 10 the rotary wing 40 will have a forward angle of attack of approximately 12 degrees above the horizontal in order to provide the necessary lift to support the autogyro 10 in flight. Thus, the rotor shaft 42 will normally be tilted about 12 degrees to the rear of the vertical in its rotary mounting in swivel ball 38. The universal tilting of the rotor shaft 42 from its normal level flight position permitted by the swivel ball 38 permits the rotary wing 40 to be universally tilted from its normal plane of rotation for controlling the flight attitude of the autogyro 10 in the manner hereinafter described in detail.

The rotor shaft 42 is provided with a substantial downward extension 44 that extends downwardly below the swivel ball 38. A movable bearing member 46 is carried on this downwardly extending portion 44 of rotor shaft 42, generally horizontal movement of this bearing member 46 in various directions causing a corresponding tilting of the rotor shaft 42.

I provide a control stick 48 which is suspended in front of the seat 24—26 from a ball joint 50 mounted on the tubular frame 12 forward of the rotor shaft 42. The control stick is universally pivotal in the ball joint 50, but is preferably held against rotation by suitable pin and groove engagements within the ball joint 50 (not shown).

The upper end 52 of control stick 48 projects above the ball joint 50, and is provided with a vertical slot 54 that is directed along the longitudinal axis of the autogyro 10. A link member 56 has a vertically arranged, flat forward portion 58 that mates within the slot 54 and is pivotal in the slot 54 by means of a horizontal pivot pin 60.

The rear end of link member 56 is rotatably and pivotally engaged in a ball joint 61 that is integrally attached to the movable bearing member 46 disposed about the downward extension 44 of rotor shaft 42.

The reversing linkage between control stick 48 and rotor shaft 42 provided by ball joint 50, upward extension 52 of stick 48, link member 56, ball joint 61 and movable bearing member 46, causes the flight responses of my autogyro 10 resulting from movements of the control stick 48 to be similar to the flight responses of an ordinary fixed wing aircraft to corresponding movements of the control stick thereof.

Thus, when the control stick 48 is pulled rearwardly toward the pilot, the upper end 52 of stick 48 will move forwardly, causing forward movement of link member 56, ball joint 61, movable bearing 46 and hence the downward extension 44 of rotor shaft 42. This will tilt the rotary wing 40 more to the rear, raising its angle of attack and causing the craft to rise.

Conversely, forward movement of the control stick 48 by the pilot will lower the angle of attack of the rotary wing 40, causing the craft to nose downwardly.

Movement of the control stick 48 to the right by the pilot (into the page in Fig. 1, or upwardly in Fig. 2) will move the upper end 52 of control stick 48 to the left, thus moving the link member 56, ball joint 61 and movable bearing member 46 to the left, and thereby tilting the rotary wing 40 to the right. This will cause a tilting to the right of the entire autogyro 10.

Conversely, movement of the control stick 48 to the left by the pilot (out of the page in Fig. 1) will cause the rotary wing 40 to tilt to the left, causing the entire craft to tilt to the left.

Referring now to my rudder mounting and construction, I provide a pair of rearwardly and downwardly directed frame members 62 and 64 at opposite sides of the tubular frame 12, these rearwardly directed frame members 62 and 64 being integrally attached to the frame 12 in the upper part of the upwardly extending portion 16 of frame 12.

A pair of parallel fins 66 and 68 are mounted on the respective said rearwardly directed frame members 62 and 64, the fins 66 and 68 supporting respective vertically hinged rudders 70 and 72.

The vertically hinged rudder section 70 is provided with a control cable 74 which is attached at one end to the movable bearing member 46 by means of a suitable fastener 76, extending laterally outwardly at right angles to the line of flight of the craft a substantial distance, and then over a suitable pulley 78 and then extending rearwardly and being attached at its rear end to an outwardly projecting arm 80 on the movable rudder 70.

The movable rudder 72 is likewise provided with a control cable 82, this control cable 82 being operatively connected at one end to the movable bearing member 46 by means of a suitable fastener 84 and then extending laterally outwardly at right angles to the line of flight of the craft a substantial distance, and then over a suitable pulley 86 and extending rearwardly from pulley 86 and having its rear end attached to an outwardly projecting arm 88 on the movable rudder 72.

The vertically hinged rudders 70 and 72 are held together in parallel relationship by means of a lateral cable link 90 operatively connected at its ends to the respective hinged rudders 70 and 72.

By thus operatively connecting the vertically hinged rudders 70 and 72 to the movable bearing member 46 through the control cables 74 and 82, whenever the control stick 48 is manipulated to tilt the rotary wing 40 to the right, the corresponding movement of movable bearing member 46 to the left will pay out cable 74 and pull in cable 82, thus deflecting both of the hinged rudders 70 and 72 to the right. Thus, this coordinated tilting of the rotary wing 40 to the right and deflecting of the rudders 70 and 72 to the right will provide a banked turn. It is to be noted that the amount of deflection of rotary wing 40 to the right and also the amount of deflection of the rudders 70 and 72 to the right are proportional to the amount of deflection of control stick 48 to the right, whereby proper, proportional coordination will at all times be provided between lateral tilting of the rotary wing 40 and lateral deflection of the hinged rudders 70 and 72.

Conversely, movement of the control stick 48 to the left will provide proportional tilting of the rotary wing 40 to the left and deflection of the rudders 70 and 72 to the left.

By providing control cables 74 and 82 which extend substantially laterally outwardly from the movable bearing member 46 before extending rearwardly to the rudders, I have rendered the rudders substantially independent of forward and rearward movement of the control stick 48. This is true because forward and rearward movement of movable bearing member 46 is at right angles to the sections of cables 74 and 82 disposed between movable bearing member 46 and the pulleys 78 and 86, and the lengths of these lateral or transverse sections of the control cables 74 and 82 are much greater than the forward and rearward movement of the movable bearing member 46.

Although I have shown and described my presently preferred autogyro 10 as including a pair of parallel, spaced fin 66 and 68 with corresponding parallel, spaced rudders 70 and 72 hinged thereto, it is to be understood that a single fixed fin member and a single vertically hinged rudder thereon are the mechanical equivalent of my preferred double rudder construction. The respective control cables 74 and 82 would merely attach to opposite sides of such a single rudder member. The claims annexed hereto therefore refer to the rudder in its singular form.

Although I have shown and described my autogyro 10 as having a rotary wing 40 that is mounted on a tiltable rotor shaft 42 whereby the plane of rotation of the rotary wing 40 is tilted for changing the attitude of the craft, it is to be understood that alternatively a fixed shaft may be provided with the pitch of the blades of the rotary wing 40 being cyclically adjustable by means of a tiltable swash plate operatively connected to the blades of the rotary wing. This tiltable swash plate would then be operatively connected to the control stick 48 in much the same manner as the tiltable shaft 44 shown and described in the present application. Also, the control cables 74 and 82 would then be attached to a downward extension from this tiltable swash plate in order to provide the coordinated control between the cyclic pitch of the rotary wing and the hinged rudder members.

Although I have shown and described the flexible control cables 74 and 82 as my presently preferred operative connections between the movable bearing member 46 and the hinged rudders 70 and 72, it is to be understood that other, equivalent mechanical connections may be provided between the movable bearing member 46 and the hinged rudders 70 and 72.

It is to be understood that the form of my invention herein shown and described is my preferred embodiment and that various changes in the shape, size and arrangement of parts may be resorted to without departing from the spirit of my invention, or the scope of my appended claims.

I claim:

1. In a rotary wing aircraft, the combination of an aircraft frame, a rotary wing rotatably mounted on said frame, said rotary wing being adjustable relative to said frame to universally adjust the direction of lift of the rotary wing relative to the frame, an adjustable control member, an operative connection between said control member and said rotary wing whereby selective adjustment of said control member will cause corresponding adjustment of said rotary wing relative to said frame and corresponding tilting of the aircraft, a rudder hingedly mounted on said frame to the rear of said rotary wing mounting, and an operative connection between said control member and said rudder, whereby selective adjustment of said control member to adjust said rotary wing relative to said frame for lateral tilting of the aircraft toward one side of its line of flight will cause a corresponding adjustment of said rudder relative to said frame to turn the aircraft in the direction of its tilt.

2. In an autogyro, the combination of an aircraft frame, forward propulsion means mounted on said frame, a rotor head assembly mounted on said frame, said rotor assembly including an auto-rotating wing that is adjustable relative to said frame to universally adjust the direction of lift of the rotary wing relative to the frame and a universally tiltable rotor head member operatively connected to said rotary wing whereby tilting of said tiltable rotor head member will cause a corresponding adjustment of said rotary wing relative to said frame, an adjustable control member, an operative connection between said control member and said tiltable rotor head member whereby selective adjustment of said control member will cause corresponding adjustment of said tiltable rotor head member and said rotary wing relative to said frame and corresponding tilting of the aircraft, a rudder hingedly mounted on said frame to the rear of said rotary wing mounting, and an operative connection between said control member and said rudder, whereby selective movement of said control member to cause lateral tilting of said tiltable rotor head member will cause a corresponding adjustment of said rotary wing relative to said frame for laterally tilting the aircraft toward one side of its line of flight and a corresponding adjustment of said rudder relative to said frame to turn the aircraft in the direction of its tilt.

3. The autogyro of claim 2 in which said universally tiltable rotor head member comprises a rotor shaft upon which the rotary wing is mounted, tilting of said rotor shaft causing a corresponding tilting of the plane of rotation of said rotary wing.

4. The autogyro of claim 2 in which said tiltable member comprises a swash plate, tilting of said swash plate causing a corresponding adjustment of the cyclic pitch of said rotary wing during its rotation.

5. The autogyro of claim 2 in which said control member comprises a control stick operatively connected to said universally tiltable rotor head member.

6. The autogyro of claim 2 in which said control member comprises a control stick downwardly suspended from said aircraft frame, said control stick being operatively connected to said universally tiltable rotor head member through a reversing lever coupling whereby tilting of said control stick in one direction will cause said universally tiltable rotor head member to tilt in the opposite direction.

7. In an autogyro, the combination of an aircraft frame, forward propulsion means mounted on said frame, a rotor head assembly mounted on said frame, said rotor assembly including an auto-rotating wing that is adjustable relative to said frame to universally adjust the direction of lift of the rotary wing relative to the frame and a universally tiltable rotor head member operatively connected to said rotary wing whereby tilting of said tiltable rotor head member will cause a corresponding adjustment of said rotary wing relative to said frame, an adjustable control member, an operative connection between said control member and said tiltable rotor head member whereby selective adjustment of said control member will cause corresponding adjustment of said tiltable rotor head member and said rotary wing relative to said frame and corresponding tilting of the aircraft, a rudder hingedly mounted on said frame to the rear of said rotary wing mounting, and an operative connection between said tiltable rotor head member and said rudder, this operative connection including an elongated connecting member attached at one end to said tiltable rotor head member at a point substantially vertically spaced from its said universal pivoting connection with said frame, said elongated connecting member extending a substantial distance laterally outwardly from said tiltable rotor head member whereby lateral tilting of said tiltable rotor head member will directly laterally move said connecting member to actuate said rudder and longitudinal tilting of said tiltable member will leave the rudder substantially unmoved, and whereby selective movement of said control member to cause lateral tilting of said tiltable rotor head member will cause a corresponding adjustment of said rotary wing relative to said frame for laterally tilting the aircraft toward one side of its line of flight and a corresponding adjustment of the rudder relative to said frame to turn the aircraft in the direction of its tilt.

8. The autogyro of claim 7 in which said operative connection between said tiltable rotor head member and said rudder includes a cable attached at one end to said tiltable rotor head member and extending a substantial distance laterally outwardly from said tiltable rotor head member, and then extending rearwardly and being operatively connected at its rear end to said rudder.

9. The autogyro of claim 8 in which said control member comprises a control stick downwardly suspended from said aircraft frame, said control stick being operatively connected to said universally tiltable rotor head member through a reversing lever coupling whereby tilting of said control stick in one direction will cause said universally tiltable rotor head member to tilt in the opposite direction.

References Cited in the file of this patent

UNITED STATES PATENTS

| | | |
|---|---|---|
| 2,437,330 | Mullgardt | Mar. 9, 1948 |
| 2,542,946 | Ross I | Feb. 20, 1951 |
| 2,661,168 | Mortka | Dec. 1, 1953 |
| 2,689,011 | Zakhartchenko | Sept. 14, 1954 |
| 2,781,182 | Ross II | Feb. 12, 1957 |